May 30, 1950  T. H. THOMAS  2,510,042
CLUTCH CONTROL MECHANISM
Filed Dec. 23, 1944  3 Sheets-Sheet 1

INVENTOR.
THOMAS H. THOMAS
BY
H. O. Clayton

May 30, 1950 T. H. THOMAS 2,510,042
CLUTCH CONTROL MECHANISM
Filed Dec. 23, 1944 3 Sheets-Sheet 2

INVENTOR.
THOMAS H. THOMAS
BY H. O. Clayton
ATTORNEY

INVENTOR.
THOMAS H. THOMAS
BY
ATTORNEY

Patented May 30, 1950

2,510,042

UNITED STATES PATENT OFFICE 2,510,042

CLUTCH CONTROL MECHANISM

Thomas H. Thomas, South Bend, Ind., assignor to Bendix Aviation Corporation, South Bend, Ind., a corporation of Delaware Application December 23, 1944, Serial No. 569,563

4 Claims. (Cl. 192—.033)

This invention relates in general to the clutch mechanism of an automotive vehicle and in particular to power means for controlling the operation thereof.

More specifically, the invention relates to a pressure differential operated power means for controlling the operation of a combined centrifugal and spring operated clutch. To this end there is provided a manifold vacuum operated motor operably connected to the spring operated pressure plate of the clutch, said plate having mounted thereon centrifugally operated means supplemented by the operation of the clutch springs in effecting the desired smooth engagement of the clutch.

A further feature of the invention relates to the provision of power means for controlling the operation of the aforementioned combined centrifugal and spring operated clutch, said means being controlled in part by the means for operating the engine throttle of the vehicle: apropos the latter feature of the invention it is an object to so correlate the opening of the throttle and the clutch engaging operation of the power means as to insure an effective operation of the centrifugal means in engaging the clutch.

A further object of the invention is to provide a pressure differential operated motor operable, in controlling the clutch engaging operation of a combined centrifugal and spring operated clutch mechanism, to effect two distinct stages of movement of the pressure plate, the first stage being relatively rapid and terminating when the driving and driven clutch elements are to a slight degree loaded by the spring means of the clutch, and the latter stage being relatively slow to effect an operation of the clutch springs to supplement the clutch engaging action of the centrifugally operated weights.

Yet another object of the invention is to so construct and arrange the parts of the aforementioned mechanism as to correlate the timing of the operation of the centrifugal mechanism with respect to the timing of the operation of the clutch springs to the end that under ordinary driving conditions the clutch plates will be initially contacted by the action of the centrifugal mechanism and to a degree by the clutch springs, said springs then supplementing the centrifugal mechanism in completing the engagement of the clutch the degree of engagement being directly proportional to the degree of depression of the accelerator. This mechanism therefore obviates a slipping clutch when the engine is temporarily subject to a heavy torque, for example, when the car, heavily loaded, is going up an incline.

Yet another object of my invention is to provide power means for quickly and completely disengaging a combined centrifugal and spring operated friction clutch; for with a conventional type of centrifugal clutch the disengagement thereof is delayed, resulting in a slipping of the clutch and in undesired deceleration of the vehicle, when the accelerator is released and the car is travelling at a relatively high speed. With my invention, however, that is, the combination of centrifugally operated means and spring operating power means for effecting the disengagement and controlling the engagement of the clutch plates, there is a complete separation of said plates immediately after control means, for example, the accelerator and either a governor or transmission controlling shift lever, is operated to effect a clutch disengaging operation of the power means.

In general, therefore, it is the object of the invention to provide an automatically operable friction clutch structure operative to accurately simulate a skillful manual operation of said clutch to the end that the vehicle may be effectively accelerated under all conditions of service.

Other objects of the invention and desirable details of construction and combinations of parts will be apparent from the following description of a preferred embodiment of the invention, taken in conjunction with the accompanying drawings, in which:

Figure 8 is a view disclosing the details of the lost motion connection between the throttle and the accelerator.

Figure 1:
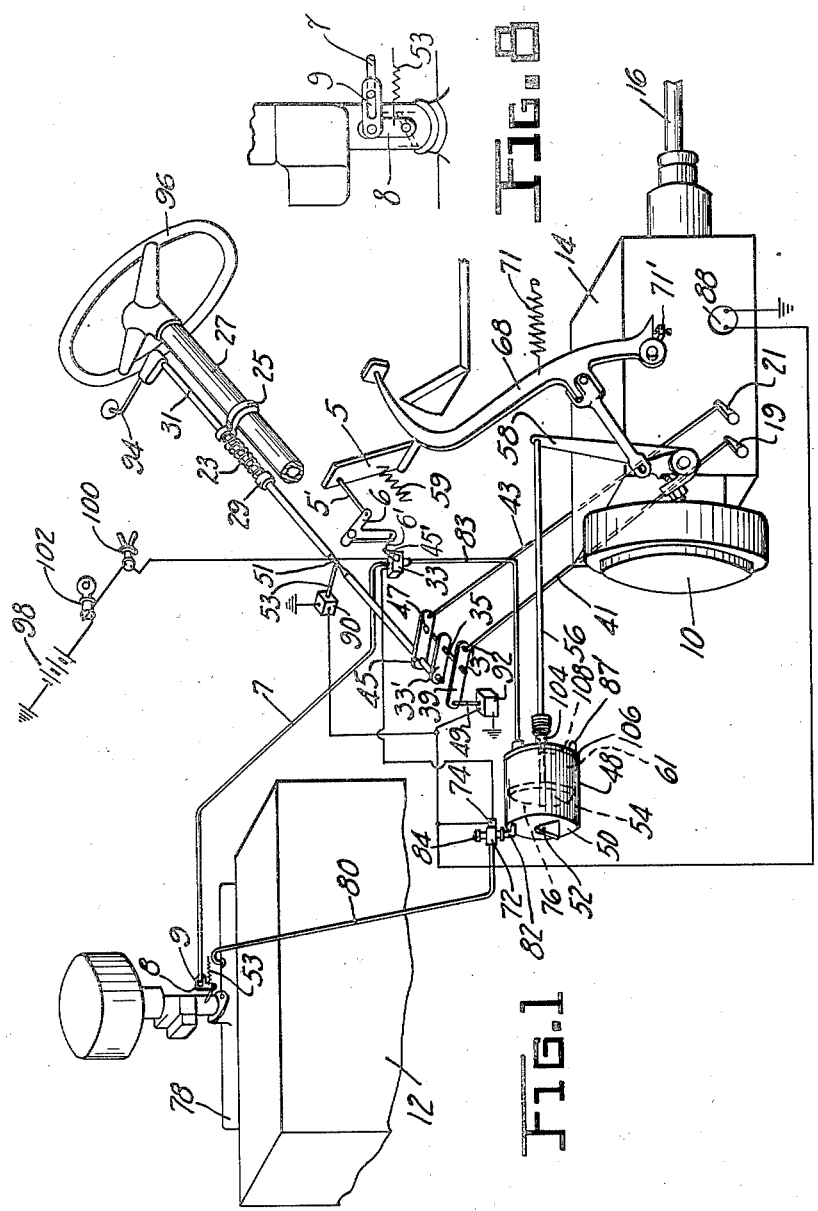
Figure 1 is a diagrammatic view of the clutch operating mechanism constituting the present invention.

In that embodiment of the invention selected for illustration, there is diagrammatically disclosed in Figure 1 a clutch mechanism 10 which is adapted to interconnect the internal combustion engine 12 of an automotive vehicle with a conventional change-speed transmission 14, the latter being drivably connected by a propeller shaft 16 with the driving wheels of the vehicle. The accelerator 5 of the vehicle is connected to a throttle operating crank 8 by means including a link 5', a lever 6, a link 6', and a link 7, the latter being provided with a pin at its end fitting with a slotted portion 9, Figure 8 of the throttle operating crank 8 to provide a lost motion connection.

Figure 2:
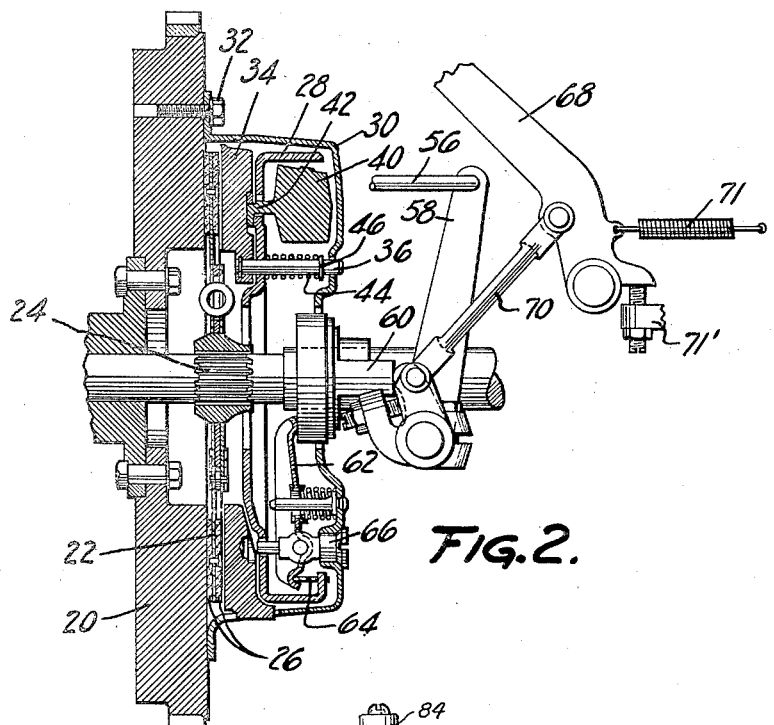
Figure 2 is a sectional view disclosing in detail the structure of the combined centrifugal and spring operated clutch to be controlled.
Figure 7:
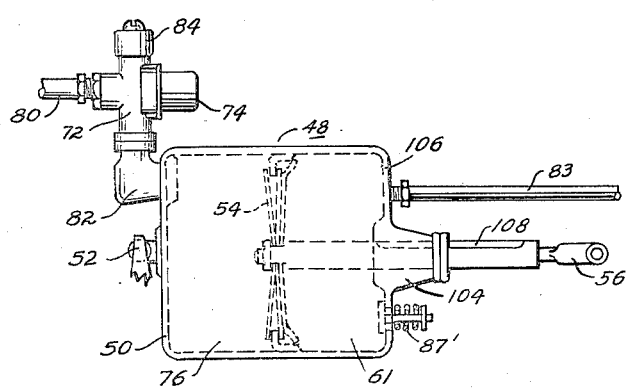
Figure 7 is a view disclosing the details of the pressure differential operated motor of applicant's invention.
Figure 3:
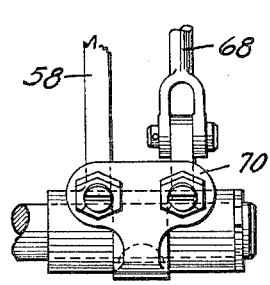
Figure 3 is a fragmentary view disclosing a portion of the connection interconnecting the clutch, the clutch motor and the clutch pedal.
Figure 4:
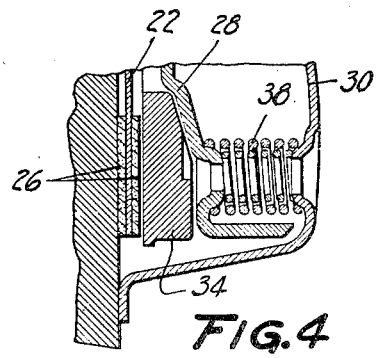
Figure 4 is an enlarged fragmentary and sectional view of a portion of the clutch structure of Figure 2 disclosing the clutch engaging springs.

My invention is directed to power means for controlling the operation of the clutch 10, the latter being of a combined centrifugal and spring operated type. As disclosed in Figure 2, a flywheel 20, drivably connected with the engine 12, constitutes the driving element of the clutch; and a disk 22, slidably keyed at 24 to a shaft drivably connected to the propeller shaft 16 and provided with friction rings 26 constitutes the driven clutch element. The means for forcing the driven clutch element into driving engagement with the driving clutch element comprises a pressure plate 28, mounted within a cup shaped housing 30 secured to the flywheel plate by fastenings 32. A ring 34, mounted on the plate by a plurality of pins 36, constitutes, together with the plate, a pressure applying unit, said unit being normally urged to the left, to engage the clutch, by means of a plurality of angularly spaced clutch springs 38, Figure 4.

A plurality of angularly spaced centrifugally operated weight members 40 each having a lever-like shank portion 42 extending through the plate 28 into engagement with the ring 34, are supplemented by the clutch engaging action of the springs 38 at or above a predetermined R. P. M. of the flywheel, the centrifugal force developed by the rotating weights serving to urge the weights outwardly in direct proportion to the angular speed of the flywheel and tending to force the ring from the plate and into engagement with the driven clutch element 26. Above the predetermined R. P. M. of the flywheel the clutch engaging springs 38 serve to supplement the clutch engaging operation of the weights 40. Springs 44 sleeved over the pins 36 between the plate 38 and stops 46, serve as return springs to keep the plate and ring together when the flywheel is static or below the aforementioned critical angular speed. The loading of the clutch is thus the additive result of the effects of the clutch springs 38 having a constant maximum effect and the centrifugally operated weights 40, the effect of the latter being a variable the value of which is a function of the R. P. M. of the flywheel.

The invention is specifically directed to power operated means for controlling both the disengagement and engagement of the aforementioned clutch, and in such fashion as to result in its most effective operation under various conditions of service of the vehicle. The above described specific clutch structure is not claimed herein.

To the above end, there is provided a fluid pressure operated motor preferably a double-ended manifold vacuum operated motor 48 comprising a cylinder 50, pivotally secured to the chassis of the vehicle at 52, and a reciprocable piston element 54, the latter being operably connected to the pressure plate 28 of the pressure unit by a rod 56, crank 58, slidable collar 60, lever operating finger members 62 and pins 64. The finger members 62 are fulcrumed intermediate their ends upon pins 66, secured to the housing member 30. The pressure plate may also be operated to disengage the clutch by means of a conventional clutch pedal 68 interconnected with the sleeve 60 by linkage 70. A spring 71 serves to maintain the pedal 68 in its off position against a stop 71'.

One of the most important features of my invention resides in the valvular mechanism for controlling the operation of the aforementioned clutch operating motor. To this end, there is provided a three-way valve 72 of conventional design such as that disclosed in Figure 4 of the U. S. patent to Hruska 2,296,282, dated September 22, 1942. The valve 72 is operated by a solenoid 74 to open the valve, that is, connect a compartment 76 of the motor 48 with the intake manifold 78 of the engine 12 via a conduit 80, valve 72, and a fitting 82, Figure 1. The three-way valve is also, of course, operated by a spring, not shown, to close the valve, that is, vent the compartment 76 to the atmosphere via an air cleaner 84, the valve 72 and the fitting 82.

The solenoid 74 is preferably controlled by an accelerator operated switch 33, Figure 5, the housing for said switch also housing a so-called second stage bleed valve described hereinafter. The solenoid 74 is also controlled by a grounded vehicle speed responsive governor operated switch 88 and grounded switches 90 and 92 actuated by a transmission and clutch controlling shift lever 94 conveniently mounted beneath the steering wheel 96 of the vehicle. As disclosed in Figure 1, the grounded governor operated switch 88 is wired in series with the solenoid 74 and the accelerator operated switch 33, the latter switch being wired to a grounded battery 98. A cut-out switch 100 and the ignition switch 102 of the ignition system of the vehicle are interposed in series in the wiring interconnecting the battery and accelerator operated switch. Each of the grounded switches 90 and 92 is also wired in series with the solenoid 74 and the accelerator operated switch 33.

Describing now the shift lever operated mechanism for operating the switches 90 and 92 the shift lever 94 is preferably connected with said switches and shift rail actuating cranks 19 and 21 by the force transmitting links and levers disclosed in Figure 1. Describing the operation of this force transmitting means and the parts thereof a spring 23, interposed between a stop 25 fixedly secured to the steering post 27 of the vehicle and a stop 29 fixedly secured to a shaft 31, serves to bias said shaft downwardly to the position disclosed in Figure 1. Now to the lower end of the shaft 31, there is fixedly secured a crank 33' through which extends a pin 35; and when said shaft is moved downwardly by the spring 23 one end of said pin extends within an opening 37 in a floating crank 39. To one end of the crank 39 there is pivotally connected a rod 41 said rod being pivotally connected at its other end to the end of the crank 19. This crank when rotated clockwise serves to actuate other force transmitting means within the casing of the three speeds forward and reverse transmission 14 to establish the transmission in its high gear setting; when said crank is rotated counterclockwise the transmission is established in its second gear setting.

The crank 21 when rotated clockwise serves to establish the transmission in its low gear setting and when rotated counter-clockwise serves to establish the transmission in reverse gear. The connection between the crank 21 and the shift lever 94 includes a link 43 pivotally connected to a crank 45, said crank being rotatably mounted on the shaft 31 which is bodily movable through said crank. This crank is provided with an opening 47 to receive one end of the pin 35.

When the driver wishes to establish the transmission in its second gear setting, he rotates the shift lever 94 counterclockwise and this operation serves to rotate the floating crank 39. Now the switch 92 is preferably so constructed that the force necessary to close the same, that is the force necessary to compress a spring within the switch connected to its movable contact, is less than the force necessary to effect the initial movement of the high second shift rail. It follows therefore that the initial movement of the shift lever 94 results in a pivoting of the crank 39 about its connection with the rod 41; and this operation results in a closing of the clutch controlling switch 92. Continued movement of the shift lever, that is the movement after the switch 92 is closed and there is no possible further movement of a link 49 interconnecting the crank 39 with said switch, results in a pivoting of said crank about its pivotal connection with the link 49; and this operation results in the operation of the transmission to establish the same in its second gear setting. After this setting is established, the driver removes his hand from the shift lever whereupon the aforementioned spring within the switch 92 operates to open said switch. This switch is so constructed that the same is also closed when the driver moves the shift lever 94 to establish the transmission in its high gear setting; and the spring means within said switch also functions to open the same when the high gear setting of the transmission has been established and the driver removes his hand from the shift lever.

Describing the operation of the switch mechanism to establish the transmission in either reverse gear or low gear the driver first rotates the shift lever 94 upwardly in a plane perpendicular to the plane of the steering wheel 96; and this operation serves to bodily move the shaft 31 upwardly against the tension of the spring 23. The upper end of the pin 35 is by this operation moved into the opening 47 and a subsequent rotation of the shift lever, either to establish the transmission in reverse or low gear, results in a rotation of the cranks 45 and 21 to effect one or the other of these settings of the transmission. The shaft 31 is provided with a recessed portion 51 which receives a pin 53 operably connected to the grounded switch 90; and as will be obvious from an inspection of Figure 1 when the shaft 31 is moved upwardly, in the operation of establishing the transmission in either reverse or low gear, the switch 90 is closed by virtue of the forcing of the pin 53 to the left, Figure 1, when the end of said pin is forced out of the recess 51 and onto the full bodied portion of the shaft.

There is thus provided, by the above described shift lever operated switch operating mechanism, means, cooperating with the accelerator operated switch 33, for effecting a clutch disengaging operation of the motor 10 during the first increment of movement of the shift lever as it is moved to establish the transmission in any one of its four gear settings. The parts of the mechanism are preferably so constructed and arranged that the clutch is disengaged before the transmission is operated. It is to be noted that the switch operating force transmitting means of my invention is such as to effect a closing of one or the other of switches 90 and 92 when the shift lever is moved in either one of two different planes. The clutch control mechanism of my invention may be incorporated in the power plant of a vehicle which includes a kickdown type of selective gear transmission of the day, that is, a transmission which may, by a manual operation of a shift lever, be established in any one of a plurality of forward gear settings or a reverse gear setting; and after a forward gear setting is established then a vacuum and spring operated kickdown motor unit, controlled by a vehicle speed responsive governor and the accelerator of the vehicle, takes over the operation of said transmission. In this type of well-known transmission mechanism incorporated on cars now in operation, the kickdown or downshift operation of the motor unit is facilitated by a momentary disabling of the ignition system of the engine; and the power plant including such a mechanism may also include a fluid coupling.

Referring now to Figure 1 disclosing the motor 48 and valvular means for controlling said motor there is provided valvular means for effecting a two-stage clutch engaging operation of said motor. The first stage valve of said valvular means comprises a hub portion 104 of an end plate 106 of the motor which hub portion co-operates with a slot 108 in the connecting rod 56 interconnecting the piston 54 with the clutch operating crank 58.

Figures 5, 6:
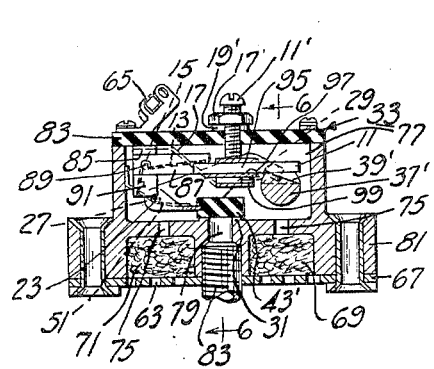
Figure 5 is a sectional view, taken on the line 5—5 of Figure 6, of the accelerator operated switch and second stage bleed valve mechanism, the latter controlling the second stage of clutch engaging operation of the motor 48.
Figure 6 is a sectional view of the valve and switch mechanism of Figure 5 taken on the line 6—6 thereof.

Referring now to Figures 5 and 6, there is here disclosed a second stage bleed valve 43', the switch 33, and the accelerator operated means for operating said valve and switch. This mechanism includes a casing 81 hollowed out in the upper part thereof to receive the switch 33, the valve 43' and the means for operating the switch and valve. To the underside of a cover member 83, which is made of a non-conductive material, there is secured a U-shaped metallic member 85 serving as a support for a movable contact member 87 pivotally mounted on a pin 89 extending through support and arms 91 and 93 of member 85. A clip 65, mounted on the top of the cover member 83, is secured to the member 85 and to this clip there is attached a conductor, Figure 1, connected with the winding of the solenoid 74. This movable contact member 85 includes a U-shaped member 95, a contact 97 secured to the member 95 and abutting a fixed contact 99 when the switch is closed, a rectangular shaped filler member 11 and the aforementioned arms 91 and 93. A prong 13 of a coil spring 15, sleeved over the pin 89, lies upon the top of the filler member 11 fitted within the U-shaped member 95, said prong serving to bias the movable contact member to its switch closed position. To the underside of the cover member 83 and by the side of the movable contact member there is secured a stamping 17, said stamping being provided at one of its ends with a laterally extending projection 19 to which is secured the fixed contact 99. A clip 67, mounted on the top of the cover member 83, is secured to the stamping 17 and to this clip there is attached a conductor, Figure 1, connected with one of the control switches 98, 100 and 102. Through an opening in the cover member 83 and an opening in that portion of the stamping 17 adjacent the projection 19 there extends a bolt 11'.

Upon the end portion of this bolt extending through the stamping 17, there is threaded a nut 13' and a spring 15' is interposed between the underside of the cover member 83 and the top side of said stamping. A lock nut 17' may be threaded on the bolt, said nut contacting the top of a spool shaped bushing 19' mounted in the cover member 83 and provided with a bore which is threaded to receive said bolt. The bolt 11' therefore provides a means for determining the degree of gap between the fixed and movable contacts 99 and 97 when the switch is opened; for either a rotation of the bolt or a rotation of the nut 13' upon the bolt will serve to either compress the spring 15' or permit the same to expand, thereby changing the distance between the contacts 97 and 99 when in their switch open positions.

Describing now the valve mechanism of the unit disclosed in Figures 5 and 6, the same comprises an irregular shaped valve support plate 21 extending crosswise of the unit and pivotally mounted upon a pin 23, the ends of which extend through the sides of the body member 81. One side of the plate 21 is turned up at 25 to provide an ear through which the pin 23 extends and the other side of said plate is turned up to provide the base portion of an arm 27 provided at its end with a laterally extending portion 29, Figure 6. The aforementioned second stage bleed valve member 43' is fixedly secured to the plate 21 and in its valve closed position contacts an annular portion 31 of the body member 81 constituting a valve seat. The valve plate 21 is held in its valve closed position by a valve spring 51. Both the valve member 43' and switch 33 are opened by a cam 37' pivotally mounted at its ends in the side walls of the body member 81 and shaped to provide flats 39' and 41' lying in different planes. A crank 47' is secured to a pin 55 extending from one end of the cam, said crank being connected to the accelerator operated lever 6 by the cam 37' and the link 6', Figure 1.

A crank 47', also connected to the cam, is connected to the throttle operating link 7, said link being connected with the throttle by the aforementioned lost motion connection to insure an opening of the switch 33 before the throttle is opened. A spring 53 serves to rotate the throttle operating crank 8 to its throttle closed position when the accelerator is released. The function of this lost motion connection will be described in greater detail hereinafter.

Describing now the operation of the switch and valve unit, when the accelerator is in its released position the cam is moved, by an accelerator return spring 59, to its switch and valve closed position disclosed in Figures 5 and 6. As disclosed in Figure 6, the portion 29 of the arm 27 is then spaced a short distance from the flat 41' of the cam. The plate 21 is at this time held in its valve closed position by the spring 51 and the movable contact member is held in its switch closed position by the spring 15. The switch 33 being closed, the clutch control mechanism then functions to disengage the friction clutch providing of course the engine is idling to create a source of vacuum and at least one of the switches 88, 90 and 92 is closed. To reengage the friction clutch below governor speed the driver depresses the accelerator to open the switch 33 and the throttle and open the valve 43'.

Describing this operation of the switch and valve unit, when the accelerator is depressed the crank 45', which is directly connected to the accelerator, is rotated, thereby rotating the cam 37'. Now, inasmuch as one edge of the flat 39' is in contact with the bottom of the member 11, it follows that the rotation of the cam serves to rotate one of the switch contact members thereby opening the switch 33. The opening of the switch results in a deenergization of the solenoid 74, thereby permitting the valve operating spring, not shown, to close the three-way valve 72; and this operation of said valve initiates a clutch engaging operation of the motor unit 48 which operation is described hereinafter.

By continuing the depression of the accelerator, the cam 37' is rotated sufficiently to take up the lost motion between the flat 39' and the stop 29, Figure 6, and further depression of the accelerator results in a rotation of the cam, and a rotation of the arm 27 and plate 21, to open the second stage bleed valve member 43'. The opening of this valve member results in a venting to the atmosphere of a compartment 61 of the clutch control motor unit 48. The air travels from said compartment via openings 63 in a plate 67 constituting the base of the valve and switch unit, compartments 69 and 71 in said unit which compartments may be filled with steel wool or other suitable air cleaning material, ports 73 and 75 in the body member 81, a compartment 77 of the unit which houses the above described switch and valve mechanism, a duct 79 and a conduit 83 connected with the motor unit 48. There is thus provided in the switch and valve unit disclosed in Figures 5 and 6, an accelerator operated means for in part controlling the operation of the clutch operating motor unit 48.

Describing now the complete operation of the clutch controlling mechanism constituting my invention, with the accelerator released, the vehicle at a standstill and the engine dead the governor operated and accelerator operated switches 88 and 33 are closed accordingly the solenoid 74 is energized to open the three-way valve 72. However, the gaseous pressure within the intake manifold is at this time equal to the pressure of the atmosphere, accordingly the motor is not energized.

Now when the engine is started the intake manifold is immediately partially evacuated by virtue of the pumping action of the engine pistons; accordingly, the compartment 76 of the motor 48 is also partially evacuated, and this results in a movement of the piston 54 to the left, Figure 1, to effect a movement of the pressure plate of the clutch away from the driven clutch plate. This movement of the piston is effected inasmuch as the same is then subjected to a differential of pressures the compartment 61 of the motor being maintained at atmospheric pressure by virtue of the operation of a check valve 87' mounted in the end plate 106 of the motor.

The driver will then probably establish the transmission in its low gear setting by an operation of the shift lever 94 and after this operation is effected he will then depress the accelerator to effect an engagement of the clutch to get the car under way. More completely describing the clutch engaging operation of the motor 48, the first increment of movement of the accelerator serves to open the switch 33; and the construction and arrangement of the parts of the mechanism, particularly the construction of the lost motion connection 9, is such that said switch is opened before the throttle is opened. Now with the opening of the switch 33, the solenoid 74 is deenergized thereby permitting the spring within the valve 72 to close said valve that is effect a venting of the compartment 76 to the atmosphere; and when said compartment is vented to the atmosphere this operation initiates a clutch engaging movement of the piston 54 under the action of the several clutch springs 38. The piston is then moved to the right Figure 1, the air in the compartment 61 being pushed out of said compartment via the slot 108 in the connecting rod 56.

When the piston has moved a certain distance to the right, the slot is covered by the hub portion 104 all as disclosed in Figure 1, whereupon the piston either comes to a stop or its rate of movement is at least reduced the operation effected being dependent upon the mode of operation of the accelerator. Now the length of the slot 108 is so determined and the remainder of the parts of the mechanism are so constructed and arranged that this first stage operation of the valve means is completed when the pressure plate of the clutch has moved sufficiently to effect a slight loading of the driving and driven clutch plates; and this operation is effected before or at substantially the same instant that the opening movement of the throttle is initiated. It follows therefore that the clutch plates are to a degree loaded when the operation of the centrifugally operated weights 40 is initiated. If at this time, the R. P. M. of the engine is not high enough to effect a clutch engaging operation of the centrifugal weights then the clutch springs 38 serve, if the vehicle load is not too high, to insure a sufficient engagement of the clutch to effect a forward motion of the vehicle.

The driver, in his operation of the accelerator, usually does not arrest the throttle opening movement of said control means accordingly continued depression of the accelerator will serve to open the throttle to speed up the engine; and when the R. P. M. of the engine is above a critical factor, which is of course relatively low, then the centrifugal weights 40 function to load the ring 34 of the pressure plate unit to effect the engagement of the clutch, this operation, as above described, being supplemented by the then existing clutch plate loading effected by the clutch springs; and, as above described, with the opening of the throttle, the second stage valve 43' comes into play to also effect a loading of the clutch plates by the clutch springs which loading, or, more specifically, the rate of increase of loading, is a function of the degree of depression of the accelerator.

There is thus provided a clutch mechanism which insures a smooth start of the vehicle from rest, the clutch springs 38 supplementing the clutch engaging operation of the weights 40. If the vehicle is perchance heavily loaded then the engine will probably be slowed down in getting the vehicle under way; and this so-called laboring of the engine results in a slipping clutch inasmuch as the weights 40 exert a clutch engaging force which is directly proportional to the speed of the engine. The clutch springs 38, however, come into action with the above described second stage operation of the motor 48 to supplement the operation of the weights thereby insuring sufficient loading of the clutch plates to prevent their slipping.

The vehicle being then under way, the driver will release the accelerator and then operate the shift lever 94 to establish the transmission in a higher gear ratio setting. As described above the first increment of movement of the shift lever serves to close one or the other of the switches 90 or 92 depending of course upon the operation of said lever. The accelerator being at the time released to close the switch 33 it follows that the motor 48 is again energized to effect a disengagement of the clutch mechanism, all as previously described. After the operation of the transmission is completed, the driver removes his hand from the shift lever thereby opening one or the other of the switches 90 or 92 to thereby effect an operation of the three-way valve 72 and initiate the above described clutch engaging operation of the motor 48. Subsequent depression of the accelerator will then, as described above, effect the second stage clutch engaging operation of the motor 48.

When the vehicle is slowed down below a certain speed then the governor operated switch 88 is closed, and, if the accelerator is at the time released to close the switch 33, then the motor 48 is again energized to effect a disengagement of the clutch mechanism.

There is thus provided means, including the clutch springs 38 and the motor 48 for operating the same, for supplementing the clutch engaging operation of the centrifugal weights 40 to insure the desired acceleration of the vehicle and prevent the clutch plate wearing effect of a slipping clutch when the engine is laboring.

While one illustrative embodiment has been described, it is not my intention to limit the scope of the invention to that particular embodiment, or otherwise than by the terms of the appended claims.

I claim:

1. In an automotive vehicle provided with an internal combustion engine, an accelerator, a throttle, force transmitting means including a lost motion connection interconnecting the accelerator and throttle, a vehicle speed responsive governor and a combined centrifugal and spring operated friction clutch including a driving plate, a driven plate, a pressure plate, centrifugally operated means for forcing the pressure plate into contact with the driven plate to thereby effect an engagement of the clutch and spring means also operable to force said pressure plate into contact with the driven plate to supplement the centrifugally operated means in its operation of engaging the clutch, power means for either moving the pressure plate to disengage the clutch or to control the movement of said plate by the spring means of the clutch to thereby control the clutch engaging operation of the centrifugally operated means and spring means, said power means comprising a stage operating pressure differential operated motor operably connected to the pressure plate, valve means, including a three-way valve, for controlling the operation of said motor, and means for controlling the operation of said valve means comprising an accelerator operated switch for in part controlling the operation of the three-way valve, said switch being opened, by virtue of the aforementioned lost motion connection, during the first increment of throttle opening movement of the accelerator, and a governor operated switch, electrically connected in series with the accelerator operated switch, also operable to control the operation of said three-way valve the operation of said valve serving to initiate the first stage clutch engaging operation of the motor.

2. In an automotive vehicle provided with an internal combustion engine having an intake manifold, an accelerator, a throttle, force transmitting means, including a lost motion connection, interconnecting said accelerator and throttle and a combined centrifugal and spring operated friction clutch, power means for controlling the operation of said clutch including an intake manifold vacuum operated two-stage motor, valve means for controlling the operation of said motor comprising a three-way valve, a first stage valve and an accelerator operated second stage valve and means for controlling the operation of said valve means comprising an accelerator operated switch for in part controlling the operation of the three-way valve, said switch being opened by virtue of the lost motion connection, during the first increment of throttle opening movement of the accelerator, and a governor operated switch, electrically connected in series with the accelerator operated switch, also operable to control the operation of said three-way valve the operation of said valve serving to initiate the first stage engaging operation of the motor.

3. In an automotive vehicle provided with an internal combustion engine having an intake manifold, an accelerator, a throttle, force transmitting means, including a lost motion connection, interconnecting said accelerator and throttle and a combined centrifugal and spring operated friction clutch, power means for controlling the operation of said clutch including an intake manifold vacuum operated two-stage motor, valve means for controlling the operation of said motor comprising a three-way valve, a first stage valve and an accelerator operated second stage valve, and means for controlling the operation of said valves including an accelerator operated switch and a governor operated switch electrically connected in series with the accelerator operated switch, said valve operating means being operable, during the first increment of throttle opening movement of the accelerator and by virtue of the aforementioned lost motion connection, to control the operation of the three-way valve to initiate a clutch engaging operation of said motor, the parts of the power means being so constructed and arranged and so operative that the first stage of clutch engaging operation of the motor is terminated when the power element of the motor has moved a certain distance, the parts of the power means being also so constructed and arranged that the second stage of clutch engaging operation of the motor is initiated when the throttle is first opened thereby providing a concurrent clutch engaging operation of both the spring and centrifugal means of the clutch to complete the engagement thereof.

4. In an automotive vehicle provided with an internal combustion engine, a vehicle responsive governor, an accelerator, a throttle and a combined centrifugal and spring operated friction clutch, power means for controlling the operation of said clutch including a two stage pressure differential operated motor including two compartments, valve means for controlling the operation of said motor including a three-way valve operable to initiate the clutch disengaging and engaging operations of the motor, a first stage bleed valve and a second stage bleed valve, and means for controlling the operation of said valve means including a governor operated switch and in series therewith an accelerator operated switch for controlling the operation of the three-way valve and accelerator operated force transmitting means for controlling the operation of the second stage bleed valve, the parts of the power means being so constructed and arranged and so operative that when the accelerator is fully released the clutch is disengaged by the motor and when the accelerator is depressed there is successively effected a first stage operation of the motor prior to the opening of the throttle and a second stage operation of said motor, said second stage operation effecting a loading of the plates of the clutch by both the centrifugal and spring means of said clutch, the degree of loading, by the spring means, being directly proportional to the degree of gaseous pressure within one of the compartments of the motor and the degree of loading by the centrifugal means being directly proportional to the speed of the engine.

THOMAS H. THOMAS.

REFERENCES CITED

The following references are of record in the file of this patent:

UNITED STATES PATENTS

| Number | Name | Date |
|---|---|---|
| 2,134,503 | Breese | Oct. 25, 1938 |
| 2,168,682 | Paine | Aug. 8, 1939 |
| 2,177,662 | Kliesrath et al. | Oct. 31, 1939 |
| 2,227,274 | Price et al. | Dec. 31, 1940 |
| 2,239,163 | Wemp | Apr. 22, 1941 |
| 2,248,377 | Nutt | July 8, 1941 |